United States Patent [19]

Krepler

[11] 4,325,935

[45] Apr. 20, 1982

[54] METHOD AND AN INSTALLATION FOR OBTAINING OR RECOVERING HYDROFLUORIC ACID

[75] Inventor: Albert Krepler, Vienna, Austria

[73] Assignee: Ruthner Industrieanlagen-Aktiengesellschaft, Vienna, Austria

[21] Appl. No.: 159,452

[22] Filed: Jun. 13, 1980

[30] Foreign Application Priority Data

Jun. 15, 1979 [AT] Austria ................................. 4267/79

[51] Int. Cl.³ .............................................. C01B 7/19
[52] U.S. Cl. ..................................... 423/483; 423/484
[58] Field of Search ................................. 423/483, 484

[56] References Cited

U.S. PATENT DOCUMENTS

| | | | |
|---|---|---|---|
| 3,073,676 | 1/1963 | Mollard et al. | 423/484 |
| 3,198,600 | 8/1965 | Mollard et al. | 423/484 |
| 3,511,603 | 5/1970 | Yaws | 423/483 |
| 3,852,430 | 12/1974 | Lienau et al. | 423/483 |
| 3,961,030 | 6/1976 | Wiewiorowski et al. | 423/483 |

FOREIGN PATENT DOCUMENTS

| | | |
|---|---|---|
| 8076 | 2/1902 | Austria . |
| 2264062 | 7/1974 | Fed. Rep. of Germany . |
| 2446844 | 5/1975 | Fed. Rep. of Germany . |
| 881532 | 11/1961 | United Kingdom ................ 423/483 |
| 925119 | 5/1963 | United Kingdom . |

*Primary Examiner*—Earl C. Thomas
*Attorney, Agent, or Firm*—Fleit & Jacobson

[57] ABSTRACT

A method of obtaining or recovering hydrofluoric acid from metal fluorides and solutions containing such, e.g. pickling solutions. In this procedure heavy metal fluorides are brought into contact with water vapor at 200° C. to 800° C., with an overall pressure of about 1 bar keeping the vapor partial pressure in a sufficiently linear relationship with the temperature in this range at a minimum of 0.9 bar at 400° C. and at a minimum of 0.5 bar at 600° C., separating the solid reaction material from the gaseous phase while still hot and obtaining aqueous hydrofluoric acid from the latter by—preferably indirect—cooling.

6 Claims, 1 Drawing Figure

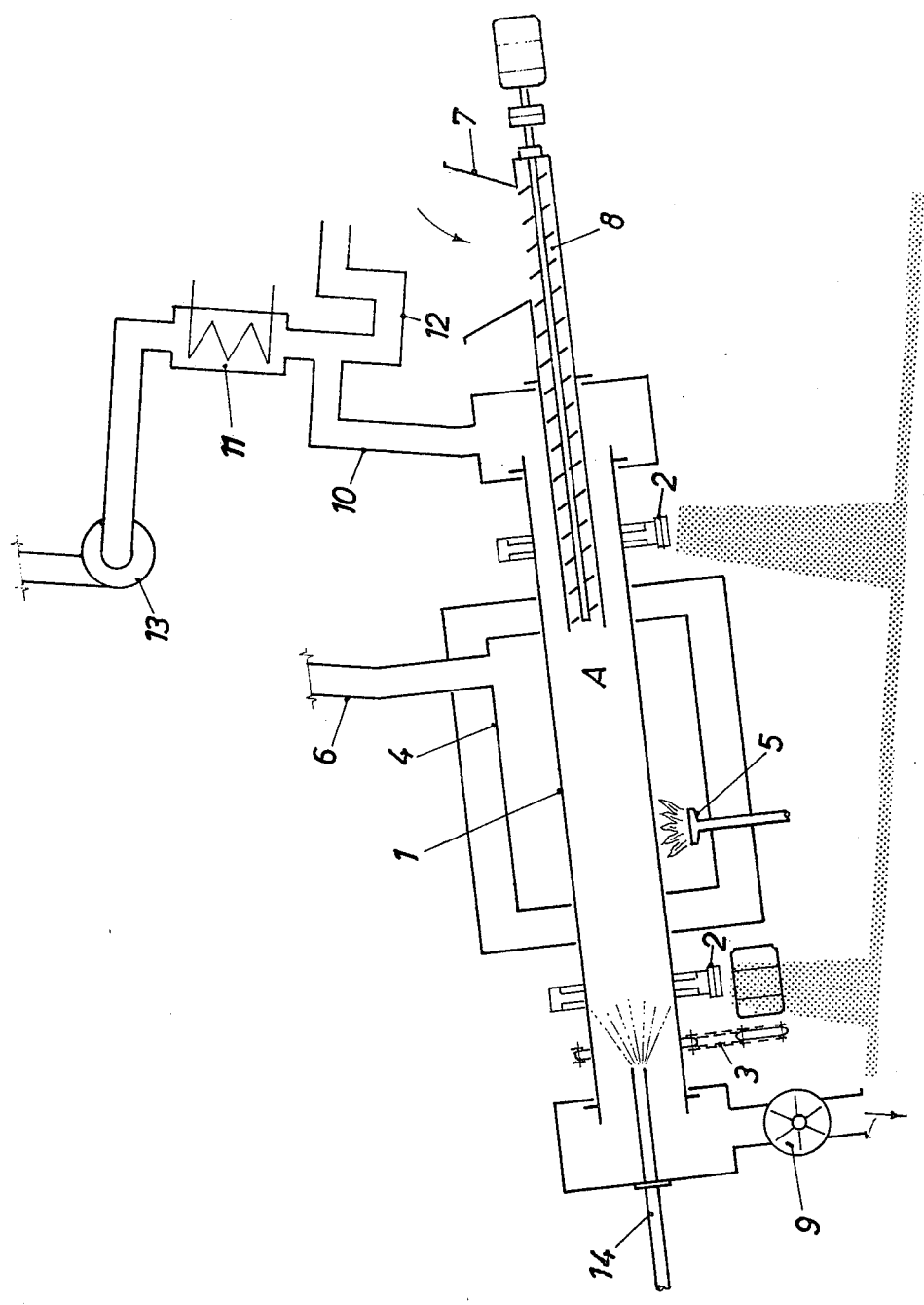

METHOD AND AN INSTALLATION FOR OBTAINING OR RECOVERING HYDROFLUORIC ACID

The object of this invention is a method and a device for producing hydrofluoric acid from heavy metal fluorides. Traditionally, hydrofluoric acid is obtained by converting calcium fluoride (fluorspar) with concentrated sulphuric acid at a temperature of about 300° C. in a revolving tubular furnace. Apart from hydrofluoric acid, this process yields gypsum as a by-product. Methods have also become known for obtaining hydrofluoric acid from fluosilic acid and from ammonium hydrogen fluoride by converting with sulphuric acid and also by pyrohydrolysis of fluosilic acid at high pressure and by decomposing alkali hydrogen fluoride.

Another process uses metal fluorides as intermediate products when liberating HF from ammonium hydrogen fluoride in the course of which "fluoro-metallates" are first formed when are then thermally cracked again when ammonium fluoride is produced and the metal fluoride is reformed.

Only one method, using electro-dialytic cracking, has become known for obtaining aqueous hydrofluoric acid from metal fluoride solutions, but this has not been used industrially.

In recent years the demand for hydrofluoric acid has grown rapidly through the production of fluorohydrocarbons and at the same time the stocks of fluorspar have been dwindling sharply. New deposits have not been found so far.

Consequently, the object must be to develop new sources for obtaining hydrofluoric acid. One particular possibility is the recovery of hydrofluoric acid from industrial waste products.

In the metallurgical industry, hydrofluoric acid is used in substantial quantities for surface-treatment (electrolytic polishing). In this, heavy metals or their oxides are dissolved and use up the pickling solution. Such solutions occur in large quantities especially when pickling stainless steel with "mixed" nitric and hydrofluoric acid; they mainly contain iron, chromium and nickel dissolved in fluoride form.

A number of known processes are used to recover part of the hydrofluoric acid in addition to other acids from these solutions. In most cases, an excess of sulphuric acid must be added first in order to liberate the hydrofluoric acid. In the process a waste product occurs in the form of an environmentally harmful acidic metal sulphate sludge.

Methods have also been described for direct crystallisation of the dissolved metals in fluoride form without adding sulphuric acid, separation and recycling of the residual solution, still containing free acids, to the pickling process.

However, the fluoride crystals separated still contain large amounts of metal-bound hydrofluoric acid which until now were lost through neutralisation.

Now, the present invention is the result of endeavours to recover these substantial amounts of hydrofluoric acid bound to heavy metals as well as integrate them into a modern recycling system.

The object is achieved in that heavy metal fluorides are made to react with water vapour at a temperature of 200°–800° C., preferably 400°–600° C.; here the partial pressure of the water vapour at 400° C. must be at least 0.9 bar and at 600° C. at least 0.5 bar. The relationship is adequately linear in the claimed temperature range. The solid material is extracted from the gaseous phase while still hot and hydrofluoric acid is obtained from the latter, preferably through indirect cooling. Naturally, it is also possible, in certain circumstances, to take advantage of direct adiabatic cooling, e.g. with waste water, and obtain hydrofluoric acid from the phase cooled in this manner.

It is recommended that the solid material be treated for over 10, preferably over 15 minutes, at a temperature of 400° C., and for over 2.5 minutes, preferably over 5 minutes, at 600° C. This relationship can also be taken as linear with sufficient accuracy within the temperature range covered.

An installation for implementing the method described above—also forming part of the invention—consists of an inclined, indirectly heated, revolving tubular furnace with a device to introduce the heavy metal fluoride at the raised end of the revolving tube and a device to discharge the solid roasted product at the lower end of the furnace, and a device to introduce water vapour into the revolving tube at its lower end and a steam extractor with an attached condenser at its raised end.

In one advantageous embodiment the inclination of the revolving tube is at least 3°, preferably 5°–10°. The maintenance of the parameters of treatment time, temperature and water vapour partial pressure, which have a complex correlation, is recognised as being of decisive importance for the implementation of the method in accordance with the invention. So, the reaction is successful at temperatures as low as 200° C. provided the treatment time is long and the water vapour partial pressure is correspondingly high. This does at least produce a fairly dilute hydrofluoric acid. At higher temperatures, however, a highly concentrated hydrofluoric acid can be produced in a short time, even with low water vapour partial pressure. But substantial problems arise with corrosion and at the same time heavy metal fluorides begin to sublimate, settling at cooler points in the installation to form a solid coating and leading to blockages. It is only within the claimed temperature range that an industrially usable reaction speed is obtained at water vapour partial pressures which also lead to the production of industrially utilizable hydrofluoric acid.

Further details of the method in accordance with the invention and a device suitable for its implementation can be seen in the attached drawing which shows an embodiment of a suitable roasting furnace.

The roasting furnace consists of a revolving tube 1 which is inclined in its longitudinal axis and is mounted on rollers 2 in the usual way and driven by a chain 3. The middle part of the revolving tube is surrounded by a silica-lined combustion chamber 4 into which projects a burner 5 whose combustion gases heat the revolving tube and then leave through the flue 6. The departing hot gases can be used in the normal way for pre-heating the combustion air and/or the material to be roasted and/or for other purposes. The material to be roasted passes through a feed hopper 7 and a screw conveyor 8 into the hot zone A of the revolving tube in which the described pyrohydrolysis operation takes place. The amount of water vapour needed for the reaction is supplied through the steam injector 14 and the metal oxide formed is discharged via the vaned expeller 9.

The discharging gas formed, which mainly consists of water vapour, hydrofluoric acid and nitric acid vapours, flows in the opposite direction to the solid roasting material and passes through the gas line 10 into the condenser 11. There the vapours condense to form regenerated hydrofluoric acid which is extracted through the syphon 12. The revolving tube and the sealed parts of the apparatus are kept under a slight negative pressure (0.1–0.2 millibars) by the fan 13.

The air getting into the revolving tube due to leaks and the $NO_2$ gas formed are extracted by this fan and expelled after cleaning in an absorption system not shown.

The following embodiment examples will serve to explain the method described above.

EXAMPLE 1

A tube made of sintered corundum with an internal diameter of 45 mm and a length of 500 mm was heated from outside by an electric heating coil. One end of the tube was attached to a line carrying superheated water vapour. The other end was connected to a cooled washing flask containing 100 ml of 1 N potassium hydroxide. The tube was heated to an internal temperature of 400° C. and a corundum boat filled with 1 g of dried iron fluoride ($FeF_3$ with 48.6% fluoride) was introduced. Then the supply of steam was turned on and after 20 minutes turned off again. The boat was removed and its contents were analysed. The product now contained just 1.1% fluoride. The contents of the washing flask were titrated with 1 N hydrochloric acid, for which 77 ml were used. From this, it was found that 0.46 g of HF had been absorbed and that the roasting operation had practically been completed given the level of precision of the test equipment. During the reaction the volume in the gas flask increased by 4.5 ml from which the amount of water vapour was deduced to be 4.5 g, giving a ratio $HF:H_2O$ of 1:10.

EXAMPLE 2

This embodiment example concerns a practical trial with an existing small industrial test installation using an indirectly heated revolving tubular furnace. The revolving tube with a diameter of 200 mm and made of a special acid- and heat-resistant steel is heated from outside over a length of 1 m to 600° C. using a gas heater. It is disposed to fall at an angle of 5.3° in the direction of the reaction and turned at one revolution per minute. Its two ends are sealed off from the inlet and discharge chambers with glands. The feeding device consists of a screw made of special acid-resistant steel, the discharge device of a vaned expeller. Through a slight negative pressure the hydrofluoric acid vapour is extracted at the inlet chamber and condensed in an indirect cooler.

Over a period of 24 hours, 100 kg of a sludge with the following composition were introduced: 24.1% $Fe^{+++}$, 5.7% $Cr^{+++}$, 0.6% $Ni^{++}$, 2.8% $NO_3$, 32% F, 34.8% $H_2O$. At the same time 20.6 kg of water vapour were introduced into the revolving tube from the discharge end. Over the same time, 100 l of hyrofluoric acid were produced containing 34.5% HF. The solid roasting product formed was 43 kg of oxide powder consisting of 77.5% $Fe_2O_3$, 19.2% $Cr_2O_3$, 15% NiO.

The entire roasting unit was kept at a negative pressure of 0.2 millibar by means of a fan located at the gas extraction end.

The crystalline sludge used for the roasting trial originated from a plant for regenerating nitric/hydrofluoric acid pickling solution for stainless steel sheet. The hydrofluoric acid produced was returned to this plant and used again for the pickling process.

The advantage of the method of obtaining hydrofluoric acid in accordance with the invention lies firstly in the fact that use can be made of a cheaper starting product which could not be recycled economically until now and was harmful to the environment. Secondly, this method allows one to dispense with the addition of sulphuric acid, through which the cost of the sulphuric acid is saved, the problem of plant corrosion is reduced and metal oxides insoluble in water are produced instead of metal sulphates which would constitute a new threat to the environment.

The method in accordance with the invention can also be implemented after sulphuric acid has been added to the material to be roasted, as corresponding tests have shown. However, this may be dispensed with in normal circumstances.

What is claimed is:

1. A method of obtaining hydrofluoric acid from heavy metal fluorides, comprising contacting heavy metal fluorides with water vapour at 400° to 600° C. and at an overall pressure of about 1 bar while maintaining the water vapour partial pressure in a sufficiently linear relationship with the temperature in this range at a minimum of 0.9 bar at 400° C. and at a minimum of 0.5 bar at 600° C., separating the solid reaction material from the gaseous phase while still hot, and recovering aqueous hydrofluoric acid from the gaseous phase by cooling.

2. The method of claim 1, wherein the heavy metal fluorides are brought in contact with water vapour in reflux.

3. The method of claim 1, wherein the reaction material is maintained at reaction temperature with a linear relationship between time and temperature in this range for over 10 minutes at 400° C. and for over 2.5 minutes at 600° C.

4. The method of claim 3, wherein the reaction material is maintained at reaction temperature with a linear relationship between time and temperature in this range for over 15 minutes at 400° C. and for over 2.5 minutes at 600° C.

5. The method of claim 3, wherein the reaction material is maintained at reaction temperature with a linear relationship between time and temperature in this range for over 15 minutes at 400° C. and for over 5 minutes at 600° C.

6. The method of claim 3, wherein the reaction material is kept at reaction temperature with a linear relationship between time and temperature in this range for over 10 minutes at 400° C. and for over 5 minutes at 600° C.

* * * * *